United States Patent Office 3,265,689
Patented August 9, 1966

3,265,689
PROCESS FOR THE PRODUCTION OF SUBSTITUTED AZULENES
Klaus Hafner, Darmstadt, and Heinrich Pelster, Leverkusen, Germany, assignors to Studiengesellschaft Kohle G.m.b.H., Mulheim (Ruhr), Germany, a corporation of Germany
No Drawing. Filed Sept. 7, 1965, Ser. No. 485,159
Claims priority, application Germany, Mar. 25, 1960, St 16,278
3 Claims. (Cl. 260—247)

This application is a continuation-in-part of application S.N. 110,228, filed March 16, 1961, now abandoned.

Our invention relates to the production of 1- and/or 3-substituted azulenes which are useful as anti-inflammatory agents. Furthermore, our invention relates to a new process of preparing substituted azulenes which renders it possible to obtain a great variety of 1- and/or 3-substituted azulenes in high yields and in a technically simple manner.

We have found that azulenes which are substituted in the 1- and/or 3-position and may be substituted in the other positions of the azulene ring system can be prepared with high yields in a technically simple manner by subjecting an azulene compound which is substituted in one of the positions 1 and 3 by hydrogen to the action of a complex acid selected from the group consisting of the fluoboric, perchloric, and hexachloro antimonic acids, in an inert solvent, introducing into the resulting reaction mixture a compound having the formula

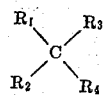

wherein $R_1$ is a member selected from the group consisting of alkyl, aralkyl and aryl,
$R_2$ is a member selected from the group consisting of hydrogen, alkyl, aralkyl, aryl and alkoxy, and
$R_3$ and $R_4$ are members selected from the group consisting of alkoxy, and, taken together, oxygen, isolating the resulting precipitate, and subjecting it to reaction with a compound selected from the group consisting of the CH—, NH—, OH— and SH— acid organic compounds and the alkali metal salts thereof, the alkali metal hydrides, the alkali metal hydroxides and the Grignard compounds.

The hydrogen atom on those carbon atoms of the azulene starting compound which is not to be reacted according to the invention can be substituted in any desired manner, for example by a substituent of the group consisting of the alkyl, aryl, halogen, nitro, alkoxy, hydroxy and carbalkoxy groups. Preferably these hydrogen atoms are substituted by an alkyl, most preferably lower alkyl group, such as methyl, ethyl, propyl, isopropyl, and the butyls.

As regards the expression "complex acid," reference is made to Houben-Weyl, Methoden der Organischen Chemie, vol. 4/2, page 206. The expression "complex acid" as used herein means an acid with a non-polarizable anion (see FIAT Reports, vol. 34/1, page 43).

Compounds of the above given formula are for instance the alkyl aldehydes such as formaldehyde, acetaldehyde, propionaldehyde, the butyraldehydes, and the aldehydes having more carbon atoms such as the valeraldehydes, hexaldehydes, heptaldehydes, octaldehydes, and stearaldehydes; the aralkylaldehydes such as phenyl acetaldehyde, β-phenyl propionaldehyde, 3-phenyl n-butyraldehyde; the araldehydes such as benzaldehyde, p-chlorobenzaldehyde, naphthaldehyde-1, naphthaldehyde-2, furfural; and the alkyl acetales of such aldehydes such as acetaldehyde diethyl acetale, propionaldehyde dimethyl acetale, n-butyraldehyde n-butyl acetale, benzaldehyde diethyl acetale; the dialkyl ketones such as acetone, methyl ethyl ketone, methyl n-propyl ketone, diethyl ketone, hexanone-2, hexanone-3, di-n-propyl ketone, di-n-amyl ketone, stearone, cyclohexanone; the alkylaryl ketones such as methyl phenyl ketone, ethyl phenyl ketone, n-butyl phenyl ketone, methyl naphthyl ketone; the diarylketones such as benzophenone; and the dialkyl ketales of such ketones such as acetone diethyl ketale or 2,2-diethoxy n-propane, 2,2-dimethyl n-butane, 2,2-di-n-butoxy n-propane, 3,3-dimethoxy n-hexane, benzophenone dimethyl ketale; the fatty acid ortho esters such as orthoformic acid triethyl ester, orthoacetic acid trimethyl ester. Preferred reactants of this group are the lower alkyl aldehydes such as acetaldehyde or a butyraldehyde, benzaldehyde, the lower alkyl acetales of said aldehydes such as acetaldehyde di-n-butyl acetale or benzaldehyde dimethyl acetale, the lower alkyl ketones and their lower alkyl ketales such as acetone or hexanone-2 and acetone di-n-butyl ketale or 2,2-dimethoxy n-hexane, and the lower fatty acid lower alkyl ortho esters such as orthoformic trimethyl ester or orthoformic tri-n-butyl ester.

The reaction is preferably carried out in an inert solvent selected from the group consisting of the low boiling di-lower alkyl ethers, such as diethyl ether, dipropyl ether, and the lower fatty acid anhydrides, such as acetic acid anhydride, propionic acid anhydride or n-butyric acid anhydride. Most preferably, the reaction is carried out in diethyl ether or acetic acid anhydride.

The compounds selected from the group consisting of the CH—, OH—, SH—, and NH— acid organic compounds are those compounds in which the hydrogen atom can be readily split off as a proton and which hydrogen atom is directly bonded to a carbon atom as well as the compounds in which the hydrogen atom in question is bonded to the carbon atom by way of a hetero atom such as N, O or S. Examples for such compounds are the lower alkyl esters of fatty acids having an activated α-methyl group such as the malonic acid esters such as malonic acid dimethyl ester, malonic acid diethyl ester, and malonic acid di-n-butyl ester; the aceto acetic acid esters such as aceto acetic acid methyl ester, aceto acetic acid ethyl ester, aceto acetic acid propyl ester, and aceto acetic acid n-butyl ester; the cyano acetic acid esters, such as cyano acetic acid methyl ester, cyano acetic acid ethyl ester, cyano acetic acid n-butyl ester; nitromethane; the monoalkylated barbituric acids such as methyl barbituric acid, ethyl barbituric acid, n-propyl barbituric acid, n-butyl barbituric acid; antipyrine; the primary and secondary amines such as methyl amine, diethyl amine, n-butyl amine, benzyl amine, benzyl methyl amine; the alcohols such as methyl alcohol, ethyl alcohol, n-propyl alcohol, isopropanol, n-butanol, and the phenoles such as phenole, p-chloro phenole, and the like. Alkali metal salts of such compounds are four instance sodium malonic acid diethyl ester, sodium aceto acetic acid ethyl ester, sodium cyano acetic acid ethyl ester, sodium ethylate, sodium phenolate, n-butyl lithium. Alkali-metal hydroxides are for instance lithium hydroxide, sodium hydroxide and potassium hydroxide. Alkali metal hydrides are for instance sodium hydride and lithium hydride as well as the akali metal complex hydrides such as lithium aluminum hydride, sodium borohydride, potassium borohydride. Grignard reagents are for instance methyl magnesium iodide, ethyl magnesium iodide, n-butyl magnesium iodide, phenyl magnesium bromide. Preferred Grignard reagents are the lower alkyl magnesium halides, preferably chlorides, bromides and iodides and most preferably iodides, as well as the phenyl magnesium halides, preferably chlorides, bromides, and iodides and most preferably bromides.

The preferred compounds of this group are the hydrides, lower alkyl compounds, lower fatty alcoholates, hydroxides and salts of lower fatty acid lower alkyl esters having an activated α-methyl group, of the alkali metals, the secondary lower alkyl amines, morpholine, piperidine, and the lower alkyl and phenyl Grignard compounds.

The first step of the reaction of the process according to the present invention may be illustrated, on azulene, acetone and fluoboric acid for instance, by the following equation:

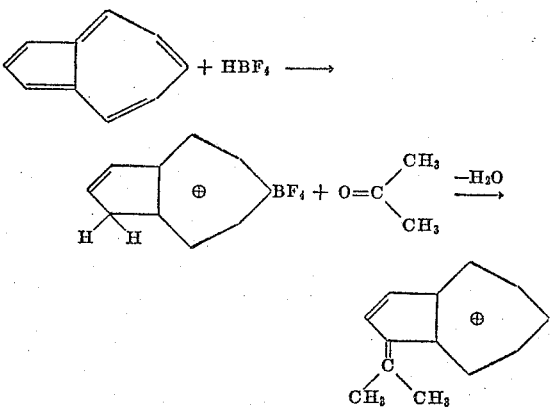

The second step of the reactiion of the process according to the present invention may be characterized, on n-butyl lithium for instance, by the following equation:

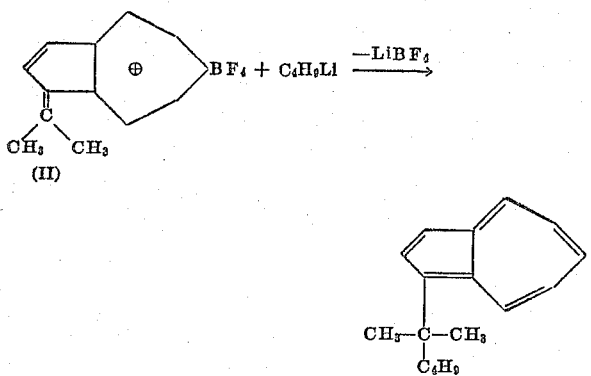

The reaction of the azulenes which are unsubstituted in at least one of the positions 1 and 3 with the complex acid and the reaction of the resulting azulenium salt with the carbonyl compounds with formation of alkylidene azulenium salts is best effected in organic solvents such as diethyl ether or acetic acid anhydride. The azulene compound which is unsubstituted in the 1-position and/or 3-position is added to a mixture of an anhydrous complex acid with an organic solvent and thereafter the carbonyl component is introduced into the reaction mixture.

The alkylidene azulenium salts precipitate in general in crystallized form and in a substantially quantitative yield and are isolated. They can be reacted either in the form of a suspension or a solution in a polar or non-polar solvent or in the absence of such a solvent or in the absence of such a solvent with an organic compound having a reactive hydrogen atom or with an alkali metal salt of such a compound.

In the process according to the present invention, the starting materials, for example the azulene compound, the complex acid and the carbonyl compound or the reactive derivative thereof, are preferably utilized in substantially equimolar proportions. However, it is also possible to work with excess quantities of one or more of the components. The reaction takes place with good yields at temperatures from approximately −50° C. to about +50° C.

The reaction is preferably carried out at approximately 20° C.

The azulenium salts of, for instance, Formula II which are obtainable as intermediate products according to the present invention are very stable, this being at least partially the reason for the surprisingly high yield and the wide possibility of use of the process according to the present invention. The azulenium salts formed with complex acids are substantially more stable than the corresponding azulenium salts of simple acids, for example of hydrohalic acids.

The invention is further illustrated by the following examples.

Example 1

17 g. of 4,6,8-trimethyl azulene are dissolved in 120 ml. of ether and 30 g. of 54% etherial fluoboric acid (prepared by mixing equimolar quantities of borofluoride etherate with anhydrous hydrofluoric acid) are introduced dropwise into this solution while cooling gently. The violet solution is thereby decolorised and a colorless precipitate is formed. 30 g. of benzaldehyde are added to this mixture while stirring vigorously and stirring is continued for another 3½ hours at room temperature. A brown salt then precipitates, this salt being 1-benzylidene-4,6,8-trimethyl azulenium fluoborate of the formula

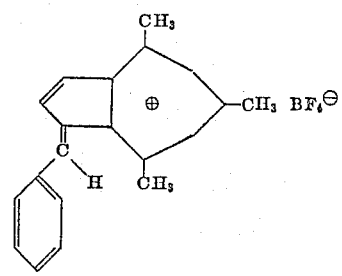

which is suction-filtered after the reaction is completed and is washed with ether. Yield: 32.5 g. (i.e. 94% of the theoretical of 1-benzylidene-4,6,8-trimethyl azulenium fluoborate).

The compound crystallizes from glacial acetic acid as long brown prisms with a melting point of 187 to 189° C. with decomposition, has unlimited stability and has absorption maxima at 416 (23,000), 422 (22,500), 431 (21,600), 435 (21,200) mμ (ε) in the visible range, when measured in nitromethane.

32 g. of 1-benzylidene-4,6,8-trimethyl azulenium fluoborate are introduced while stirring into an ethereal solution of 0.24 mol of lithium alanate, the operation taking place in a nitrogen atmosphere. The mixture becomes violet in color and methanol is added after 20 minutes in order to destroy the excess lithium alanate. The ethereal phase is washed with dilute sulphuric acid and thereafter with water. After removing the solvent, the 1-benzyl-4,6,8-trimethyl azulene

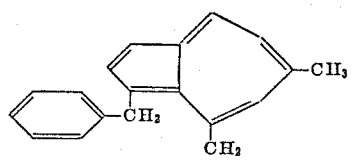

is obtained in the form of violet crystals. Yield: 17 g. (75% of the theoretical).

The compound crystallizes from ethanol as long dark blue prisms with the melting point of 74 to 75° C. and has absorption maxima in the visible range at 566 (515), 588 (458), 608 (413), 668 (214) mμ (ε) (in n-hexane). The trinitro-benzolate of 1-benzyl-4,6,8-trimethyl azulens melts at 122 to 123° C.

Example 2

If 4,6,8-trimethyl azulene is reacted with acetaldehyde in the manner described in Example 1, the 1-ethylidene-4,6,8-trimethyl azulenium fluoborate

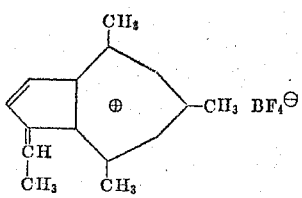

is obtained as a yellow powder with a yield of 90% of the theoretical. The salt is best stored at 0° C. since it is decomposed after a time at room temperature. The compound melts at 134 to 136° C. with decomposition and has absorption maxima in the visible range at 381 (3290), 410 (4150) m$\mu$ ($\epsilon$) (in nitromethane).

The 1-ethylidene-4,6,8-trimethyl azulenium fluoborate is reacted with lithium alanate in a manner analogous to that indicated in Example 1 in respect of the 1-benzyl-4,6,8-trimethyl azulene, and in this way there is obtained the 1-ethyl-4,6,8-trimethyl azulene

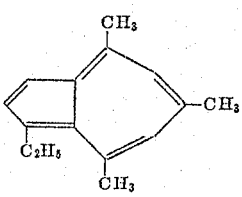

with a yield of 88% of the theoretical. After chromatography on aluminum oxide, the substance melts at from 35 to 36° C. and has absorption maxima in the visible range at 680 (98), 617 (320), 604 (374), 595 (374), 580 (413), 573 (423) m$\mu$ ($\epsilon$) (in n-hexane).

The trinitrobenzolate of 1-ethyl-4,6,8-trimethyl azulene melts at 148 to 149° C.

Example 3

6 g. of 1-benzyl-4,6,8-trimethyl azulene are reacted in 600 ml. of ether with 15 ml. of fluoboric acid and 30 ml. of benzaldehyde in the manner described in Example 1 in respect of 1-benzylidene-4,6,8-trimethyl azulenium fluoborate. In this way, there is obtained the 3-benzylidene-1-benzyl-4,6,8-trimethyl azulenium fluoborate as a red powder

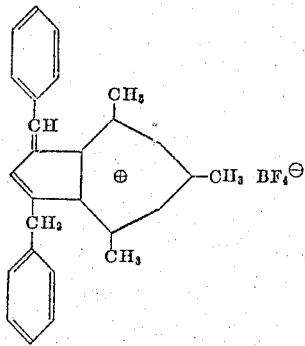

with a yield of 77% of the theoretical. The salt crystallizes from glacial acetic acid as brick red crystals having the melting point of from 169 to 171° C. with decomposition and has absorption maxima in the visible range at 386 (17,200), 393 (17,000), 401 (15,600), 415 (15,400), 457 (14,500), m$\mu$ ($\epsilon$) (in nitromethane).

6 g. of 3-benzylidene-1-benzyl-4,6,8-trimethyl azulenium fluoborate are reacted in a manner analogous to that indicated in Example 1 in respect of the 1-benzyl-4,6,8-trimethyl azulene with 0.12 mol of lithium aluminum hydride and the reaction mixture is worked up in the manner indicated therein. There are thus obtained 2.8 g. of 1,3-dibenzyl-4,6,8-trimethyl azulene (i.e. 58% of the theoretical) having the formula

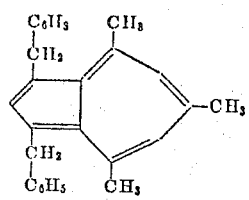

The compound crystallizes from ethanol as blue needles having the melting point of 114 to 115° C. and has absorption maxima in the visible range at 580 (467), 628 (362), 687 (120) m$\mu$ ($\epsilon$) (in n-hexane).

Example 4

15 g. of 1-benzylidene-4,6,8-trimethyl azulenium perchlorate, prepared as described in Example 1 by replacing the ethereal solution of fluoboric acid by a mixture of the equivalent amount of 60% aqueous perchloric acid and a mixture of acetic acid anhydride and ether, and having a decompostion point of from 205 to 207° C., are slowly introduced into a solution of 0.18 mol of phenyl magnesium bromide in 500 ml. of ether while stirring and cooling with ice and common salt. The solution immediately becomes violet in color. After 15 minutes it is decomposed, first with methanol and then with dilute sulphuric acid. The ethereal phase is freed from the solvent and the 1-benzhydryl-4,6,8-trimethyl azulene is obtained as a viscous, blue mass.

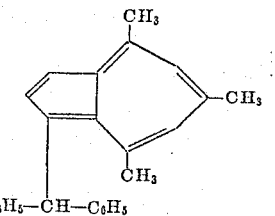

The compound can be purified by chromatography on aluminum oxide with petroleum ether. Yield: 6.3 g. (i.e. 45% of the theoretical).

The 1-benzyhydryl-4,6,8-trimethyl azulene has an absorption maximum in the visible range at 565 (460) m$\mu$ ($\epsilon$) (in n-hexane).

Example 5

In a manner analogous to Example 1, 40 ml. of ethereal 54% fluoboric acid are added to a solution of 10 g. of azulene in 400 ml. of ether. 30 ml. of acetone are then run in while cooling with ice and the mixture is stirred for 1½ hours, whereby the 1-isopropylidene azulenium fluoborate precipitates in the form of yellow needles.

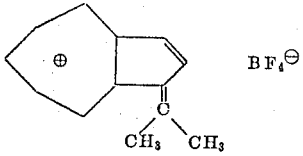

These are suction-filtered in the absence of moisture and washed with ether. Yield: 18 g. (i.e. 90% of the theoretical).

The 1-isopropylidene azulenium fluoborate melts at 131 to 132° C. with decomposition and has absorption maxima in the visible range at 377 (4150), 432 (4300) m$\mu$ ($\epsilon$) (in nitromethane). The compound cannot be kept for long at room temperature and is consequently best stored in a cool place. 18 g. of 1-isopropylidene azulenium fluoborate are reacted in the same manner as described in Example 4 in connection with the 1-benzhydryl-4,6,8-trimethyl-azulene with ethereal methyl magnesium iodide solution. The 1-tert.-butyl azulene is thereby obtained as a blue oil.

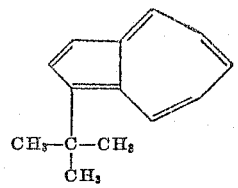

Yield: 8 g. (i.e. 62% of the theoretical).

The compound has absorption maxima in the visible range at 738 (76), 665 (212), 628 (226), 607 (254), 584 (218), 567 (183) mμ (ε) (in n-hexane). The trinitrobenzolate of 1-tert.-butyl azulene melts at 124 to 125° C.

*Example 6*

20 g. of 1-ethylidene-4,6,8-trimethyl-azulenium fluoborate (Example 2) are reacted in the manner analogous to the instructions given for 1-benzhydryl-4,6,8-trimethyl azulene (Example 4) with 0.15 mol of lithium methyl in 500 ml. of ether in a nitrogen atmosphere. There is thus obtained the 1-isopropyl-4,6,8-trimethyl azulene as a violet oil.

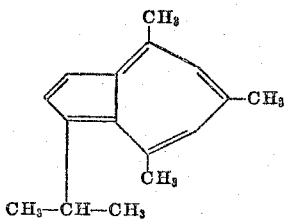

Yield: 9 g. (i.e. 60% of the theoretical).

The 1-isopropyl-4,6,8-trimethyl azulene has absorption maxima in the visible range at 680 (73), 619 (269), 572 (370) mμ (ε) (in n-hexane). The trinitrobenzolate of the compound melts at 121 to 122° C.

*Example 7*

20 g. of 1-ethylidene-4,6,8-trimethyl-azulenium fluoborate (Example 2) are slowly introduced into a solution of 0.15 mol of alcoholate-free sodium malonic ethyl ester in 500 ml. of tetrahydrofuran while stirring and cooling with ice and common salt. After 15 minutes the solution is decomposed, first with methanol and then with dilute sulfuric acid. The ethereal phase is freed from the solvent whereby there is obtained the 1-(α-methyl-β,β-dicarbethoxy)-ethyl-4,6,8-trimethyl azulene as bluish violet needles.

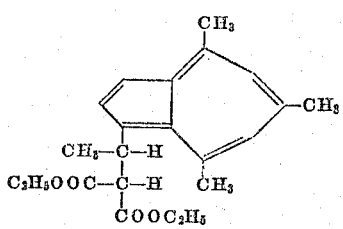

Yield: 16 g. (i.e. 61% of the theoretical).

The compound melts at 22 to 25° C. and has absorption maxima in the visible range at 656 (83), 600 (291), 563 (358) mμ (ε) (in n-hexane).

*Example 8*

15 g. of 1-ethylidene-4,6,8-trimethyl-azulenium fluoborate are introduced while stirring into 50 ml. of anhydrous liquid dimethylamine. After 15 minutes, 200 ml. of ether are added and the excess amine is washed out with water. After removing the solvent in vacuo, the 1-α-dimethyl amino ethyl-4,6,8-trimethyl azulene is obtained as a violet oil.

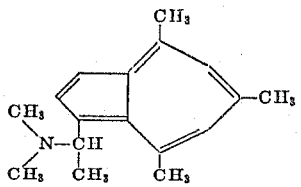

The compound can be purified by chromatography on basic aluminum oxide, activity stage IV, with petroleum ether. Yield: 5.5 g. (i.e. 44% of the theoretical).

The compound has an absorption maximum in the visible range at 560 (452) mμ (ε) (in n-hexane).

*Example 9*

15 g. of 1-ethylidene-4,6,8-trimethyl azulenium fluoborate are introduced while stirring into 100 ml. of morpholine and worked up as described in Example 8. The 1-α-morpholinoethyl-4,6,8-trimethyl azulene is obtained in the form of violet crystals.

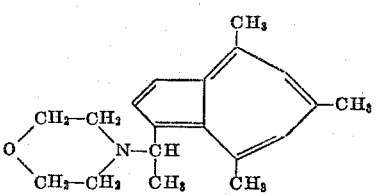

Yield: 8.8 g. (i.e. 58% of the theoretical).

The 1-α-morpholinoethyl-4,6,8-trimethyl azulene melts at 72 to 75° C. and has absorption maxima in the visible range at 657 (12), 558 (435) mμ (ε) (in n-hexane).

*Example 10*

20 g. of guaiazulene are dissolved in 800 ml. of ether and reacted in a manner similar to Example 1 with 45 ml. of fluoboric acid and 40 ml. of benzaldehyde. The reaction mixture is stirred for 5½ hours at room temperature. The 3-benzylidene guaiazulenium fluoborate is obtained thereby.

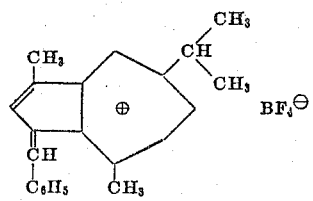

The product forms red crystals. These crystallize from glacial acetic acid as red needles having the melting point 148 to 150° C. with decomposition. Yield: 35 g. (i.e. 93% of the theoretical).

20 g. of 3-benzylidene guaiazulenium fluoborate are reacted in a manner analogous to Examples 8 and 9 with piperidine. There is thereby obtained the 3-α-piperidinobenzyl guaiazulene in the form of blue crystals.

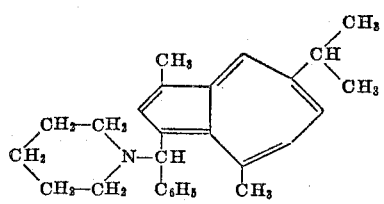

Yield: 12 g. (i.e. 59% of the theoretical).

The compound melts at 78 to 80° C. and has absorption maxima in the visible range at 740 (88), 670 (300), 615 (397) mμ (ε) (measured in n-hexane).

Example 11

6 g. of 1-ethylidene-4,6,8-trimethyl azulenium perchlorate, melting at 156 to 159° C. with decomposition and being obtained as described in Example 1 by substituting the ethereal solution of fluoboric acid by the equivalent amount of 60% aqueous perchloric acid and a mixture of ether and acetic acid anhydride and by starting from acetaldehyde in place of benzaldehyde, are introduced into a solution of 0.55 g. of sodium in 200 ml. of methanol, whereby the 1-α-methoxy ethyl-4,6,8-trimethyl azulene is formed.

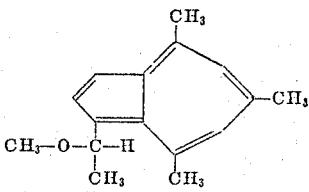

This is taken up in ether, washed with water and the solvent is removed. The compound is obtained as a dark blue solid compound, which can be purified by chromatography on aluminum oxide. Yield: 2.7 g. (i.e. 58% of the theoretical).

The 1-α-methoxy ethyl-4,6,8-trimethyl azulene melts at 43 to 45° C. and has an absorption maximum in the visible range at 560 (436) mμ (ε) (in n-hexane).

Example 12

If 1-ethylidene-4,6,8-trimethyl azulenium perchlorate or fluoborate (Example 2) is reacted with a suspension of dilute sodium hydroxide solution in tetrahydrofuran, the 1-α-hydroxy ethyl-4,6,8-trimethyl azulene is obtained in a manner analogous to Example 11 in the form of violet crystals. Yield: 30% of the theoretical.

The compound melts at 87 to 88° C. and has an absorption maximum in the visible range at 556 (470) mμ (ε) (in n-hexane).

Example 13

In a manner analogous to Example 1, 4,6,8-trimethyl azulene is reacted with fluoboric acid and orthoformic acid triethyl ester. The 1-ethoxy-methylene-4,6,8-trimethyl azulenium fluoborate is obtained as a greenish yellow powder with a yield of 81% of the theorectical.

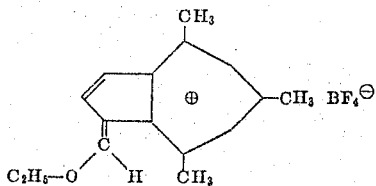

The compound melts at 184 to 189° C. with decomposition. The 1-ethoxy methylene-4,6,8-trimethyl azulenium fluorborate is reacted in a manner similar to that described in Example 12 in respect of the 1-α-hydroxy ethyl-4,6,8-trimethyl azulene with sodium hydroxide solution in tetrahydrofuran. There is thereby obtained the 4,6,8-trimethyl azulene-1-aldehyde in the form of red crystals with a yield of 79% of the theoretical.

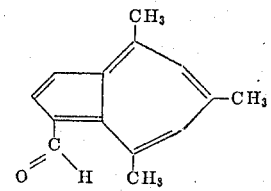

The compound melts at 106 to 107° C. and has absorption maxima in the visible range at 617 (137), 520 (650) mμ (ε) (in n-hexane).

What we claim is:

1. The process which comprises subjecting an azulene compound which is substituted in one of the positions 1 and 3 by hydrogen to the action of a complex acid selected from the group consisting of the fluoboric, perchloric, and hexachloro antimonic acids, in an inert solvent, introducing into the resulting reaction mixture a compound having the formula

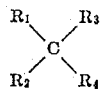

wherein
$R_1$ is a member selected from the group consisting of alkyl, aralkyl and aryl,
$R_2$ is a member selected from the group consisting of hydrogen, alkyl, aralkyl, aryl and alkoxy, and
$R_3$ and $R_4$ are members selected from the group consisting of alkoxy and, taken together, oxygen,
isolating the resulting precipitate and subjecting it to reaction with a compound selected from the group consisting of the CH—, OH—, SH—, and NH— acid organic compounds and the alkali metal salts thereof, the alkali metal hydroxides, the alkali metal hydrides and the Grignard compounds.

2. The process according to claim 1 wherein the reaction of the azulene compound with the complex acid is carried out in an inert solvent selected from the group consisting of diethyl ether and acetic acid anhydride.

3. The process of claim 1 wherein the reaction is carried out at a temperature of from —50° C. and +50° C.

No references cited.

ALEX MAZEL, *Primary Examiner.*

JOSE TOVAR, *Examiner.*